(12) United States Patent
Al-Babtain

(10) Patent No.: US 7,252,702 B2
(45) Date of Patent: Aug. 7, 2007

(54) HYDROGEN PURIFICATION OPTIMIZATION SYSTEM

(75) Inventor: Ibrahim M. Al-Babtain, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 972 days.

(21) Appl. No.: 10/626,911

(22) Filed: Jul. 25, 2003

(65) Prior Publication Data

US 2007/0017155 A1    Jan. 25, 2007

(51) Int. Cl.
*B01D 53/047* (2006.01)
(52) U.S. Cl. ............................................ 95/96; 95/141
(58) Field of Classification Search ............ 95/96, 95/103, 116, 141
See application file for complete search history.

(56) References Cited

U.S. PATENT DOCUMENTS

| | | | |
|---|---|---|---|
| 4,398,926 A | 8/1983 | Doshi | |
| 5,332,424 A | 7/1994 | Rao et al. | |
| 5,332,492 A | 7/1994 | Maurer et al. | |
| 5,435,836 A | 7/1995 | Anand et al. | |
| 5,447,559 A | 9/1995 | Rao et al. | |
| 5,507,856 A * | 4/1996 | Rao et al. ............ | 95/50 |
| 5,753,010 A | 5/1998 | Sircar et al. | |
| 5,980,609 A | 11/1999 | Baker et al. | |
| 6,183,628 B1 | 2/2001 | Baker et al. | |
| 6,946,016 B2 * | 9/2005 | Reddy ............ | 95/96 |
| 2002/0146359 A1 | 10/2002 | Lomax, Jr. et al. | |

FOREIGN PATENT DOCUMENTS

| | | |
|---|---|---|
| DE | 30 46 268 A | 7/1982 |
| EP | 0 945 163 A1 | 9/1999 |
| EP | 1 101 731 A | 5/2001 |
| WO | WO 00/27505 | 5/2000 |

OTHER PUBLICATIONS

Patent Abstracts of Japan vol. 1995, No. 04, May 31, 1995 & JP 7 000746 A (Nippon Steel Corp), Jan. 6, 1995 abstraqct.
Patent Abstracts of Japan vol. 0172, No. 16 (C-1053), Apr. 28, 1993 & JP 4 357101 A (Sumitomo Metal Ind Ltd), Dec. 10, 1992 abstract.

* cited by examiner

*Primary Examiner*—Robert Hopkins
(74) *Attorney, Agent, or Firm*—Bracewell & Guiliani LLP

(57) ABSTRACT

A method of hydrogen recovery in refineries and petrochemical operations in which some or all of the feed streams for separate PSA units are combined and utilized as feed for a single PSA unit, and in which some or all of steam reformer product and refinery offgas streams being used as feed streams for separate PSA units are combined and utilized as feed for a single PSA unit. Total hydrogen recovery is increased by maximizing hydrogen recovery from refinery offgases. The load on the steam reformer is reduced by lowering the reformer feed stream. Refinery fuel gas consumption is reduced in the steam reformer furnace. The amount of a PSA feed stream being burned as fuel or sent to flare is reduced. The load on the PSA unit receiving feed from refinery offgases is reduced. The hydrocarbon content and heating value of the tail gas from the PSA unit fed by the steam reformer product stream is enriched.

25 Claims, 1 Drawing Sheet

HYDROGEN PURIFICATION OPTIMIZATION SYSTEM

BACKGROUND OF THE INVENTION

1. Field of the Invention

The present invention relates to the recovery of hydrogen from gas mixtures and, more particularly, to a method for obtaining increased hydrogen recovery from oil refineries and petrochemical or natural gas operations by combining a steam reformer hydrogen product stream with an offgas stream and utilizing the combined stream as feed for a single pressure swing adsorption (PSA) unit.

2. Description of the Related Art

The use of pressure swing adsorption (PSA) to separate gas mixtures is well known in the art. More specifically, it is known that one or more PSA units can be used to recover hydrogen from streams containing mixtures of hydrogen and hydrocarbons in refineries and petrochemical operations. For example, it has been previously proposed that a single PSA unit be utilized within a refinery or petrochemical operation to recover hydrogen from a flow stream. U.S. Pat. No. 5,435,836 by Anand et al. titled "Hydrogen Recovery By Adsorbent Membranes" shows a single PSA unit being used to treat a steam-methane reformer product stream. Similarly, U.S. Pat. No. 5,507,856 by Rao et al. titled "Hydrogen Recovery By Adsorbent Membranes" shows a single PSA unit being used to treat a combined stream made up of a steam-methane reformer product stream and a refinery waste stream. It has also been previously proposed that multiple PSA units be utilized within a refinery process to promote increased hydrogen recovery. For example, Patent No. WO0027505 by Ravi and Satish titled "Recovery of $CO_2$ and $H_2$ from PSA Offgas in an $H_2$ Plant" shows a gas separation process in which multiple PSA units are utilized.

However, these and other previously proposed arrangements for hydrogen recovery using PSA units suffer from a number of disadvantages. For example, in the case where multiple PSA units are being utilized to treat different feed streams, if some portion of the feed stream for one of the PSA units was to exceed the capacity of the PSA unit, the excess portion is not effectively utilized to promote hydrogen recovery. Instead, the excess portion is typically sent to flare or burned as fuel gas elsewhere in the refinery. Another disadvantage of previously proposed arrangements using multiple PSA units is that in order to achieve maximum hydrogen recovery, each PSA unit must be operated at or near maximum capacity. Operating these units at such high capacity damages the adsorbent material within the units by increasing the likelihood that impurities will be carried over between adsorbent layers. Also, operating some of these PSA units at or near maximum capacity requires an increased feed stream and fuel gas stream for the unit operation providing the feed stream, which raises operating costs.

Accordingly, prior to the development of the present invention, there has been no single method of hydrogen recovery in refineries and petrochemical operations in which some or all of the feed streams from separate PSA units were combined and utilized as feed for a single PSA unit, and in which some or all of a steam reformer product stream and a refinery offgas stream being used as feed streams for separate PSA units were combined and utilized as feed for a single PSA unit, and in which total hydrogen recovery was increased by maximizing hydrogen recovery from refinery offgases, and in which the load on the steam reformer was reduced by lowering the reformer feed stream, and in which refinery fuel gas consumption was reduced in the steam reformer furnace, and in which the amount of excess gases from a PSA feed stream being burned as fuel or sent to flare was reduced, and in which the load on the PSA unit receiving feed from refinery offgases was reduced, and in which the hydrocarbon content and heating value of the tail gas from the PSA unit fed by the steam reformer product stream was enriched.

Therefore, the art has sought a method of hydrogen recovery in refineries and petrochemical operations in which some or all of the feed streams for separate PSA units are combined and utilized as feed for a single PSA unit, and in which some or all of steam reformer product and refinery offgas streams being used as feed streams for separate PSA units are combined and utilized as feed for a single PSA unit, and in which total hydrogen recovery is increased by maximizing hydrogen recovery from refinery offgases, and in which the load on the steam reformer is reduced by lowering the reformer feed stream, and in which refinery fuel gas consumption is reduced in the steam reformer furnace, and in which the amount of a PSA feed stream being burned as fuel or sent to flare is reduced, and in which the load on the PSA unit receiving feed from refinery offgases is reduced, and in which the hydrocarbon content and heating value of the tail gas from the PSA unit fed by the steam reformer product stream is enriched.

SUMMARY OF THE INVENTION

In accordance with the present invention, the foregoing advantages have been achieved through the present method for hydrogen recovery. The present invention includes the steps of: forming a combined stream, the combined stream including at least a portion of a product stream from a steam reformer and at least a portion of an offgas stream, wherein the portion of the offgas stream is taken from a feed stream for a first pressure swing adsorption unit; passing at least a portion of the combined stream through a second pressure swing adsorption unit; and recovering a high-purity hydrogen stream from the second pressure swing adsorption unit. A feature of the present invention is that the operating pressure of the steam reformer is set so as to allow the offgas stream to flow into and combine with the product stream from the steam reformer. Another feature of the present invention is that the pressure of the product stream from the steam reformer is from about 280 psig to about 330 psig. A further feature of the present invention is that the pressure of the offgas stream from the refinery is from about 280 psig to about 330 psig. An additional feature of the present invention is that the hydrogen recovery occurs in a refinery operation. A further feature of the present invention is that the hydrogen recovery occurs in a petrochemical plant operation. An additional feature of the present invention is that the hydrogen recovery occurs in a natural gas processing plant operation. Another feature of the present invention is that the steam reformer feed contains butane. A further feature of the present invention is that the steam reformer feed contains propane. An additional feature of the present invention is that the load on steam reformer is reduced. A further feature of the present invention is that the fuel gas consumption in a furnace for steam reformer is reduced. An additional feature of the present invention is that the amount of refinery offgas burned as fuel is reduced. A further feature of the present invention is that the amount of refinery offgas sent to flare is reduced. A further feature of the present invention is that the load on the first PSA unit is reduced. An additional feature of the present invention is that the hydrocarbon content of tail gas from the second PSA unit is increased. A further feature of the present invention is that the heating value of tail gas from the second PSA unit is increased.

In accordance with another aspect of the present invention, the foregoing advantages have also been achieved through the present method for hydrogen recovery. This aspect of the present invention may include the steps of: forming a combined stream, the combined stream including at least a portion of a first stream and at least a portion of a second stream, wherein the portion of the first stream is taken from a feed stream for a first pressure swing adsorption unit, and wherein the portion of the second stream is taken from a feed stream for a second pressure swing adsorption unit; passing at least a portion of the combined stream through at least one of the first and second pressure swing adsorption units; and recovering a high-purity hydrogen stream from the pressure swing adsorption unit receiving the combined stream.

The method of hydrogen recovery of the present invention, when compared with previously proposed methods, has the advantages of: increasing total hydrogen recovery by maximizing hydrogen recovery from refinery offgases, reducing the load on the steam reformer by lowering the reformer feed stream, reducing refinery fuel gas consumption in the steam reformer furnace, reducing the amount of refinery offgases burned as fuel or sent to flare, reducing the load on the PSA unit receiving feed from refinery offgases, and enriching the hydrocarbon content and heating value of the tail gas from the PSA unit fed by the steam reformer product stream.

While the invention will be described in connection with the preferred embodiment, it will be understood that it is not intended to limit the invention to that embodiment. On the contrary, it is intended to cover all alternatives, modifications, and equivalents as maybe included within the spirit and scope of the invention as defined by the appended claims.

DETAILED DESCRIPTION OF THE INVENTION

Figure 1:
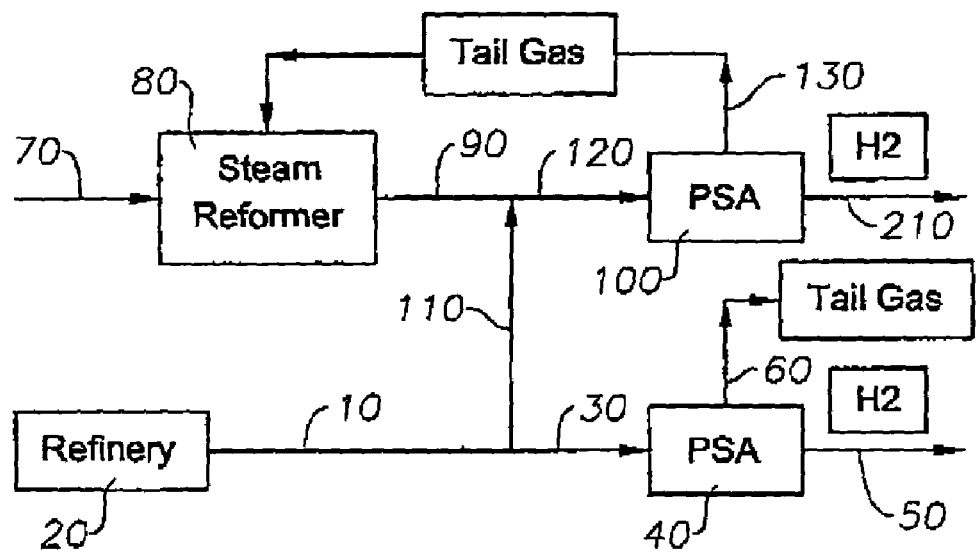
FIG. 1 is a schematic drawing of a flow scheme for a preferred embodiment of the present invention.

FIG. 1 shows a preferred embodiment for improving hydrogen recovery in a refinery or petrochemical operation according to the present invention. Offgas stream 10 preferably comes from refinery 20, and is typically a refinery waste stream containing hydrogen, hydrocarbons, and other components. Alternatively, offgas stream 10 may originate elsewhere or contain different components. A portion of stream 10 is utilized as a feed stream 30 for a first PSA unit 40. Preferably, about 90% of stream 10 is used as feed for first PSA unit 40, as any more would increase the likelihood of carryover of impurities within unit 40. First PSA unit 40 separates hydrogen from the other components in feed stream 30 to produce a high-purity hydrogen product stream 50 and a tail gas stream 60. Stream 60 is utilized for fuel elsewhere in the refinery or for other desired purposes.

Steam reformer 80 has a hydrocarbon-containing feed stream 70 that is catalytically reacted with steam in reformer 80 to produce a steam reformer product stream 90 containing primarily hydrogen, carbon monoxide, and carbon dioxide. Preferably, feed stream 70 contains propane and/or butane. Steam reformer 80 includes a furnace 81 (not shown) for consuming fuel gas or tail gas 130. Product stream 90 is utilized as a portion of a feed stream 120 for a second PSA unit 100. Second PSA unit 100, can alternatively receive feed from elsewhere or containing different components. Product stream 90 is combined with a stream 110 that is diverted from offgas stream 10. This diverted stream is an excess gas stream that would otherwise be sent to flare or burned as fuel gas. The resulting combined stream 120 is used as a feed stream for second PSA unit 100. Steam reformer 80 is generally operated at about 330 psig. However, the operating pressure of reformer 80 can be adjusted as necessary to promote the merger of feed stream 110 with steam reformer product stream 90 and to avoid the lower pressure stream from being "blocked" from entry into the higher pressure stream. Second PSA unit 100 produces a high-purity hydrogen product stream 210. Tail gas stream 130 from second PSA unit 100 is recycled and reintroduced to steam reformer 80 as fuel gas via furnace 81 (not shown).

Figure 2:
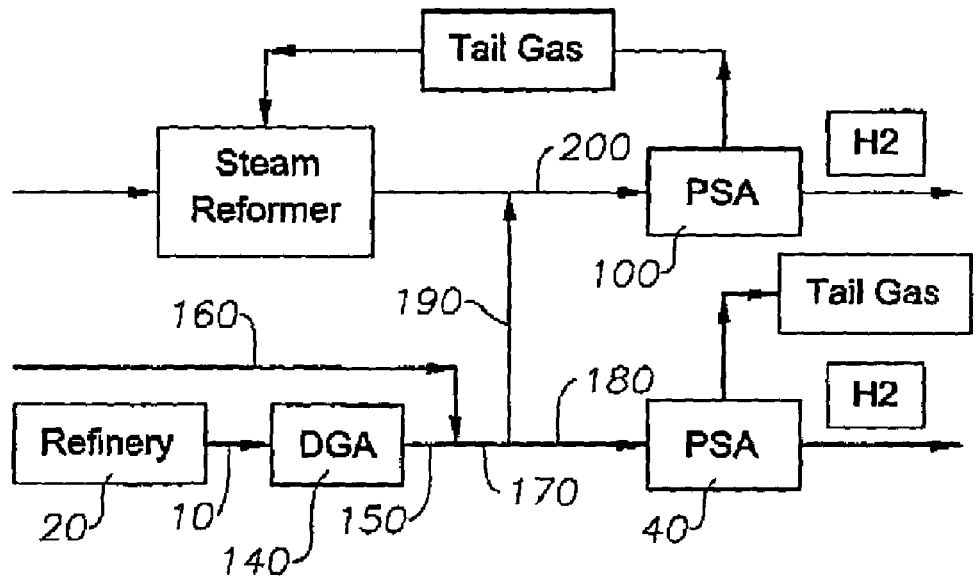
FIG. 2 is a schematic drawing of a flow scheme for an embodiment of the present invention.

With reference to FIG. 2, another embodiment of the method for hydrogen recovery of the present invention is illustrated. Offgas stream 10 from refinery 20 is passed through a diglycolamine absorber (DGA) unit 140 to remove acid gas components such as $H_2S$ and $CO_2$ in order to produce a "sweetened" product stream 150. Product stream 150 is then mixed with a continuous catalyst regeneration stream 160 to produce resulting stream 170. Stream 170 is then split into a feed stream 180 for first PSA unit 40 and a stream 190 that ultimately becomes part of feed stream 200 for second PSA unit 100.

The invention is now further described by the following example, which is intended to be illustrative of the invention and its advantages, but is not intended to limit the scope or underlying principles in any way.

EXAMPLE

An embodiment of the present invention was implemented in a refinery setting and evaluated to determine the effect on various process data. A summary of the process data before and after implementation of the present invention is shown in Table 1.

TABLE 1

PROCESS DATA COMPARISON

| Process Parameter | Before implementation | After implementation | Units |
|---|---|---|---|
| Butane feed to steam reformer | 22,000 | 13,300 | MLB/HR |
| Flow diverted to second PSA unit from refinery offgas stream | 0.0 | 0.63 | MMSCFD |
| Fuel gas flow to reformer furnace | 5.5 | 3.0 | MLB/HR |
| Refinery gases flared and/or burned | 0.63 | 0.0 | MSCFH |
| Steam reformer outlet stream | 74.0 | 75.0 | mol % $H_2$ |
| | 7.0 | 7.0 | mol % CO |
| | 16.0 | 16.0 | mol % $CO_2$ |
| | 1.0 | 0.9 | mol % $C_1$ |

After implementation of the present invention as illustrated in Table 1, the butane feed to the steam reformer was reduced by about 1000 BBL/day, and the steam reformer furnace fuel gas consumption was reduced by about 1.5 MMSCFH. Also, the flared gases were reduced by about 630 MSCFH, and instead utilized for hydrogen production. At about 82 mole % hydrogen in the flared gases, this resulted in about 417 MSCFH of additional hydrogen production. Also, the load to the first PSA unit was reduced from 100% to about 90% by shifting about 10% of the load, or about 0.63 SCFD, from the first PSA unit to the second PSA unit.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

I claim:

1. A method of hydrogen recovery comprising the following steps:
    forming a combined stream, the combined stream including at least a portion of a product stream from a steam reformer and at least a portion of an offgas stream from a refinery, wherein the portion of the offgas stream is taken from a feed stream for a first pressure swing adsorption unit;
    passing at least a portion of the combined stream through a second pressure swing adsorption unit; and
    recovering a high-purity hydrogen stream from the second pressure swing adsorption unit.

2. The method of claim 1, wherein the operating pressure of the steam reformer is set so as to allow the offgas stream to flow into and combine with the product stream from the steam reformer.

3. The method of claim 1, wherein the pressure of the product stream from the steam reformer is from about 280 psig to about 330 psig.

4. The method of claim 1, wherein the pressure of the offgas stream from the refinery is from about 280 psig to about 330 psig.

5. The method of claim 1, wherein the hydrogen recovery occurs in a refinery operation.

6. The method of claim 1, wherein the hydrogen recovery occurs in a petrochemical plant operation.

7. The method of claim 1, wherein the hydrogen recovery occurs in a natural gas processing plant operation.

8. The method of claim 1, wherein the steam reformer has a butane feed.

9. The method of claim 1, wherein the steam reformer has a propane feed.

10. The method of claim 1, whereby the load on the steam reformer is reduced.

11. The method of claim 1, whereby fuel gas consumption in a furnace for the steam reformer is reduced.

12. The method of claim 1, whereby the amount of refinery offgas burned as fuel is reduced.

13. The method of claim 1, whereby the amount of refinery offgas sent to flare is reduced.

14. The method of claim 1, whereby the load on the first PSA unit is reduced.

15. The method of claim 1, whereby the hydrocarbon content of tail gas from the second PSA unit is increased.

16. The method of claim 1, whereby the heating value of tail gas from the second PSA unit is increased.

17. A method of hydrogen recovery comprising the following steps:
    forming a combined stream, the combined stream including at least a portion of a first stream and at least a portion of a second stream, wherein the portion of the first stream is taken from a feed stream for a first pressure swing adsorption unit, and wherein the portion of the second stream is taken from a feed stream for a second pressure swing adsorption unit;
    passing at least a portion of the combined stream through at least one of the first and second pressure swing adsorption units; and
    recovering a high-purity hydrogen stream from the pressure swing adsorption unit receiving the combined stream.

18. The method of claim 17, wherein the pressure of the first stream is from about 280 psig to about 330 psig.

19. The method of claim 17, wherein the pressure of the second stream is from about 280 psig to about 330 psig.

20. The method of claim 17, wherein the hydrogen recovery occurs in a refinery operation.

21. The method of claim 17, wherein the hydrogen recovery occurs in a petrochemical plant operation.

22. The method of claim 17, wherein the hydrogen recovery occurs in a natural gas processing plant operation.

23. The method of claim 17, whereby load on the first pressure swing adsorption unit is reduced.

24. The method of claim 17, whereby hydrocarbon content of a tail gas from the second pressure swing adsorption unit is increased.

25. The method of claim 17, whereby the heating value of tail gas from the second pressure swing adsorption unit is increased.

* * * * *